US012091882B2

(12) United States Patent
Morrison

(10) Patent No.: US 12,091,882 B2
(45) Date of Patent: Sep. 17, 2024

(54) DOOR LATCH CLASP ASSEMBLY

(71) Applicant: RE-SECURE LATCH LLC, Phoenix, AZ (US)

(72) Inventor: Michael Morrison, San Tan Valley, AZ (US)

(73) Assignee: RE-SECURE LATCH LLC, Phoenix, AZ (US)

( * ) Notice: Subject to any disclaimer, the term of this patent is extended or adjusted under 35 U.S.C. 154(b) by 0 days.

(21) Appl. No.: 17/748,287

(22) Filed: May 19, 2022

(65) Prior Publication Data

US 2022/0372791 A1 Nov. 24, 2022

Related U.S. Application Data

(60) Provisional application No. 63/190,325, filed on May 19, 2021.

(51) Int. Cl.
*E05B 17/00* (2006.01)

(52) U.S. Cl.
CPC ................................ *E05B 17/0012* (2013.01)

(58) Field of Classification Search
CPC ........................... E05B 17/0012; E05B 55/005
See application file for complete search history.

(56) References Cited

U.S. PATENT DOCUMENTS 5,761,936 A * 6/1998 Katayama ........... E05B 17/2084
292/358

* cited by examiner

*Primary Examiner* — Christine M Mills
*Assistant Examiner* — Yahya Sidky
(74) *Attorney, Agent, or Firm* — Jacob M. Ward; Ward Law Office

(57) ABSTRACT

A door latch clasp assembly configured for use with a door having a door latch assembly and a door latch plate is provided. The door latch clasp assembly includes a first aperture section having a first aperture. The first aperture section has an arcuate cross-sectional shape. A second aperture section has a second aperture and the second aperture section has an arcuate cross-sectional shape. An intermediate section extends from the first aperture section to the second aperture section. The intermediate section has an arcuate cross-sectional shape and a latch assembly aperture. The arcuate cross-sectional shapes of the first and the second aperture sections and the arcuate cross-sectional shape of the intermediate section are configured to approximate an arcuate cross-sectional shape of a perimeter wall of a face bore of the door.

5 Claims, 7 Drawing Sheets

DOOR LATCH CLASP ASSEMBLY

CROSS REFERENCE TO RELATED APPLICATIONS

This application claims the benefit of U.S. Provisional Application No. 63/190,325 filed on May 19, 2021. The entire disclosure of the above application is incorporated herein by reference.

FIELD

The present disclosure relates generally to residential and commercial door repair, and more particularly, to securing a door latch and or dead latch to a door.

INTRODUCTION

This section provides background information related to the present disclosure which is not necessarily prior art.

Various door latches or dead latches can become loose inside a door, causing the door latch to extent from the door, fall out of the door or generally become inoperable. As a result, this can prevent a door from closing properly by not allowing the door latch to engage an opposing striker plate. This can be caused by one or more fasteners, such as screws, losing their ability to grab onto a material inside the door due to the screw(s) being stripped out over time or by repeated changing of the door latch hardware.

There is a need to provide a system configured to secure original or replacement door latch components that overcomes such shortcomings and wear related to door latches.

SUMMARY

In concordance with the instant disclosure, a door latch clasp assembly configured to secure a door latch plate and a door latch assembly to a door has surprisingly been discovered.

The above objects as well as other objects not specifically enumerated are achieved by a door latch clasp assembly configured for use with a door having a door latch assembly and a door latch plate. The door latch clasp assembly includes a first aperture section having a first aperture. The first aperture section has an arcuate cross-sectional shape. A second aperture section has a second aperture and the second aperture section has an arcuate cross-sectional shape. An intermediate section extends from the first aperture section to the second aperture section. The intermediate section has an arcuate cross-sectional shape and a latch assembly aperture. The arcuate cross-sectional shapes of the first and the second aperture sections and the arcuate cross-sectional shape of the intermediate section are configured to approximate an arcuate cross-sectional shape of a perimeter wall of a face bore of the door.

The above objects as well as other objects not specifically enumerated are also achieved by a door latch clasp assembly kit configured for use with a door having a door latch assembly and a door latch plate. The door latch clasp assembly kit includes a door latch clasp assembly having a first aperture section, a second aperture section and an intermediate section extending from the first aperture section to the second aperture section. The first aperture section has a first aperture, and an arcuate cross-sectional shape. The second aperture section has a second aperture and an arcuate cross-sectional shape. The intermediate section has an arcuate cross-sectional shape and a latch assembly aperture. A plurality of mounting hardware is configured to extend through the door latch plate and connect with the first and second apertures. The arcuate cross-sectional shapes of the first and the second aperture sections and the arcuate cross-sectional shape of the intermediate section are configured to approximate the arcuate cross-sectional shape of a perimeter wall of a face bore of the door.

The above objects as well as other objects not specifically enumerated are also achieved by a method of using a door latch clasp assembly configured for use with a door having a door latch assembly and a door latch plate. The method includes the steps of forming a door latch clasp assembly having a first aperture section and a first aperture, a second section having a second aperture and an intermediate section extending therebetween and having a latch assembly aperture, the first and second aperture sections and the intermediate section having an arcuate cross-sectional shape, positioning the door latch clasp assembly against an arcuate cross-sectional shape of a perimeter wall of a face bore of the door, aligning apertures in the door latch plate with the first and second apertures in the first and second aperture sections and extending a plurality of mounting hardware through the apertures in the door latch plate to the first and second apertures in the first and second aperture sections and tightening the plurality of mounting hardware.

In an exemplary embodiment, a door latch clasp assembly (also referred to herein as "re-secure latch") can be constructed of a piece of aluminum (e.g., about 3⁄16 inch thick, about 3½ inch curved length, and about 1⅛ inch width). The re-secure latch can be curved and configured to fit within and complement the curve or shape inside a door bore hole (e.g., a 2⅛ inch circumference door bore hole). The re-secure latch can be designed to have a thin footprint and to sit inside along the side of the bore hole wall on the same side where the latch is inserted. The re-secure latch can have a 1⅛-inch center aperture, either having a contiguous or noncontiguous perimeter, to allow the door latch and or dead latch to pass through and to be inserted therein. The re-secure latch can have fastener apertures, including threaded apertures configured to accept machine screws, where the fastener apertures can be place one each side of the center cut. The threaded apertures can be configured to accept #10 flat head—24 thread per inch—machine screws. The re-secure latch can have a 3⁄16-inch-thick wall throughout to provide enough threading for machine screws to screw into while remaining thin enough to work with many different door hardware manufacturers.

Various types of materials can be used to construct the re-secure latch. Embodiments include aluminum and various aluminum alloys, but the re-secure latch can also be comprised of any type of metal, metal compounds, metal composites, glass, glass composites, ceramics, ceramic composites, plastics, plastics composites, fiber glass, fiber glass composites, carbon fiber, carbon fiber composites, organic compounds, wood, wood composites.

The re-secure latch provides certain benefits and advantages in securing door latches, door handles, and associated hardware. Re-secure latch is brand new, there is nothing like it available on the market today. Re-secure latch is a door hardware intended to be used inside a door bore hole. Re-secure latch can be used to create a new medium or backing for the supplied machined screws to be inserted into and screwed into to tighten the latch into the door. Re-secure latch can be used when an existing material inside the door has been worn out or damaged, and conventional screws that used to be inserted into a latch to be screwed into the door can no longer catch/screw into the inside material of the door. The re-secure latch can sit on the inside of a door bore hole, over the latch, on the same side of the door where the latch is inserted. Re-secure latch can be configured to allow a dead latch cylinder housing that requires room to sit inside the door bore hole for installation. The re-secure latch has a thin footprint and is not visible, except for the fasteners (e.g., machine screws) used to tighten down the latch, once the door hardware is reinstalled.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
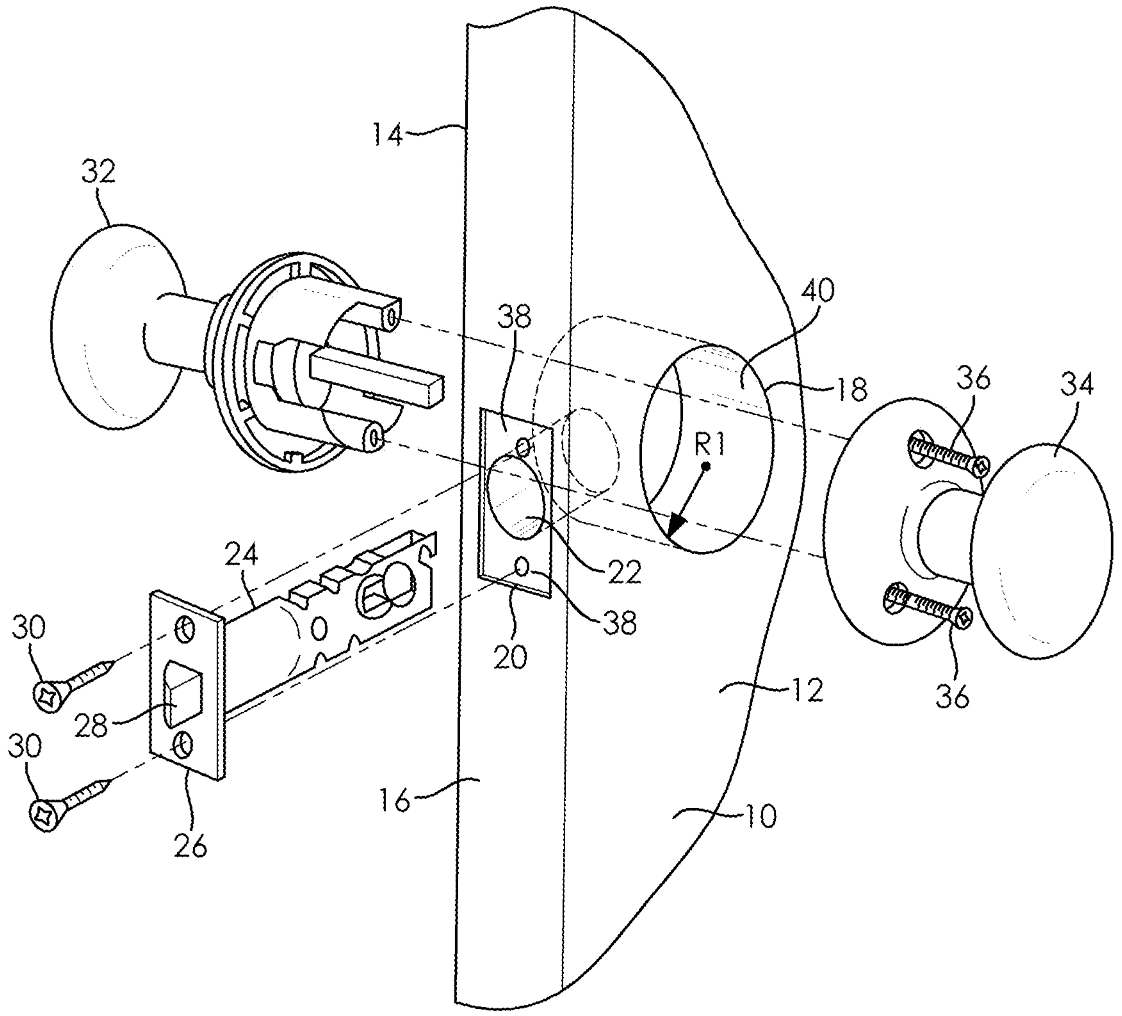
FIG. 1 is a perspective schematic illustration, partially in phantom, of a conventional door having conventional latch assembly and doorknobs.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to"

another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with the illustrated embodiments of the present disclosure, a door latch clasp assembly is provided. Generally, the door latch clasp assembly overcomes issues with installing or replacing door latch hardware, where an original door latch and or dead latch is no longer able to be fastened or secured to a door. Such issues can arise, for example, where one or more fasteners are used to secure the door latch no longer catch or hold to the inside of the door material, where the fastener is undersized (e.g., due to wear and stripping of the door material), and where larger screw fasteners can simply cause further damage to the door. The door latch clasp assembly latch provided by the present disclosure advantageously facilitates re-use of an existing door latch and or dead latch. The door latch clasp assembly is configured for seating inside a face bore of the existing door, against a perimeter wall of the face bore while encircling a portion of the latch assembly positioned inside the face bore. One or more fasteners are subsequently inserted through the existing latch plate and into the door latch clasp assembly, thereby securing and tightening the latch assembly to the door.

Referring now to the drawings, there is illustrated in FIG. 1 a diagrammatic and simplified view of a door 10. The door 10 is conventional in the art and will only be briefly described herein. The door 10 includes a first major side 12, an opposing second major side 14 and an outer edge 16 extending therebetween. The door 10 also includes a face bore 18 that extends from the first major side 12 to the second major side 14. The face bore 18 is defined by an interior perimeter wall 40. The face bore 18 has a generally circular cross-sectional shape and a radius R1. The radius R1 will be discussed in more detail below.

Referring again to FIG. 1, the door 10 includes a latch plate mortise 20 positioned in the outer edge 16. An edge bore 22 extends from the latch plate mortise 20 to the face bore 18. A latch assembly 24 is positioned within the edge bore 22 and extends into the face bore 18. A latch plate 26 abuts from an outer end of the latch assembly 24 and a latch 28 and is seated in the latch plate mortise 20. The latch plate 26 is secured to the door 10 with mounting hardware 30 configured to engage latch plate apertures 38 located in the latch plate mortise 20.

Referring again to FIG. 1, as is known in the art, opposing first and second knob assemblies 32, 34 are positioned on opposing sides of the face bore 18 in a manner such as to engage the latch assembly 24.

Figure 2:
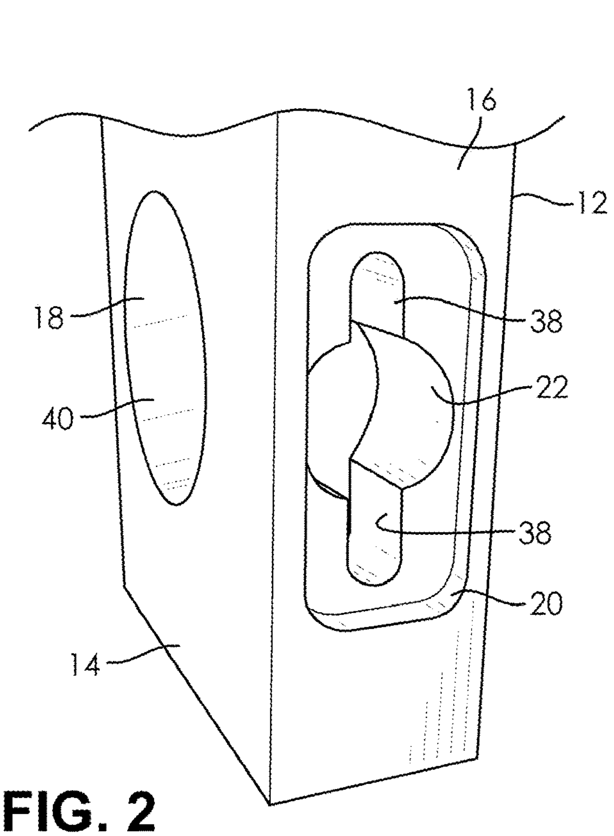
FIG. 2 is a perspective view of the conventional door of FIG. 1, shown without the conventional latch assembly and doorknobs and illustrating door material removed from latch plate apertures.
Figure 3:
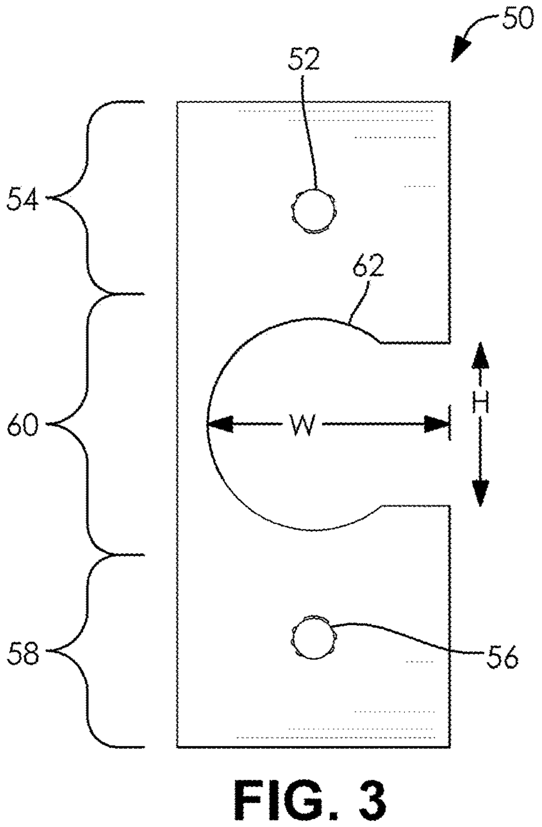
FIG. 3 is a front view of a novel door latch clasp assembly configured for use with the conventional door of FIG. 1.
Figure 4:
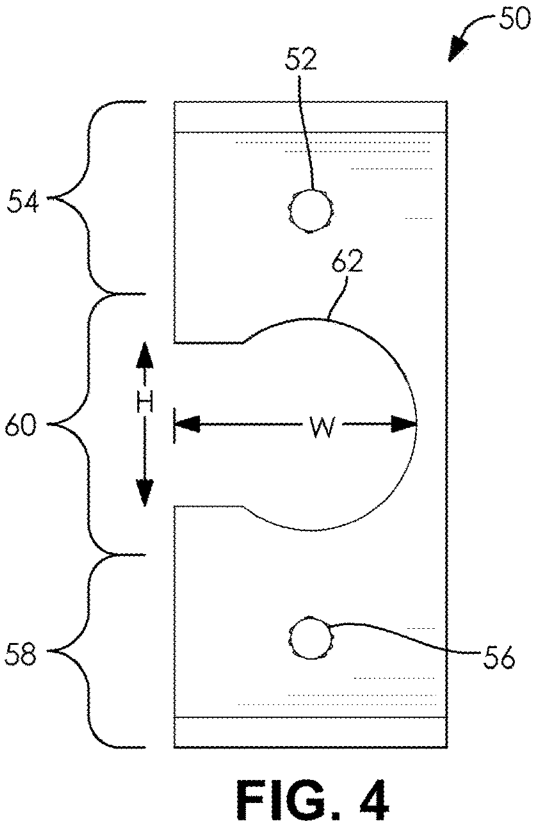
FIG. 4 is a rear view of the novel door latch clasp assembly of FIG. 3.

Referring now to FIG. 2, a used door 10 is shown without the associated latch and knob components. The door 10 includes the first and second major sides 12, 14, the outer edge 16, the face bore 18, the latch plate mortise 20 and the edge bore 22. The latch plate apertures 38 are enlarged due to wear and stripping of the door material. In this event, it may be difficult for the latch mounting hardware 30 to properly secure the latch assembly 24 to the door 10.

Referring now to FIGS. 3-5 and 7, 8, a novel door latch clasp assembly 50 (hereafter "clasp assembly") is illustrated. Generally, the clasp assembly 50 advantageously facilitates re-use of an existing door latch and or dead latch in the event the door material forming the latch plate apertures is damaged or worn away. The clasp assembly 50 can include a first aperture 52 positioned in a first aperture section 54, a second aperture 56 positioned in a second aperture section 58 and an intermediate section 60 extending from the first aperture section 54 to the second aperture section 58. In certain embodiments, the first aperture 52 can be spaced apart from the second aperture 56 by a distance of about 1.5 inches to 2 inches, and most particularly, about 1.6 inches. The intermediate section 60 can include a latch assembly aperture 62. As will be explained in more detail below, the first and second apertures 52, 56 can be configured to receive mounting hardware and the latch assembly aperture 62 is configured to partially encircle a portion of the latch assembly 24 positioned within the face bore 18.

Figure 5:
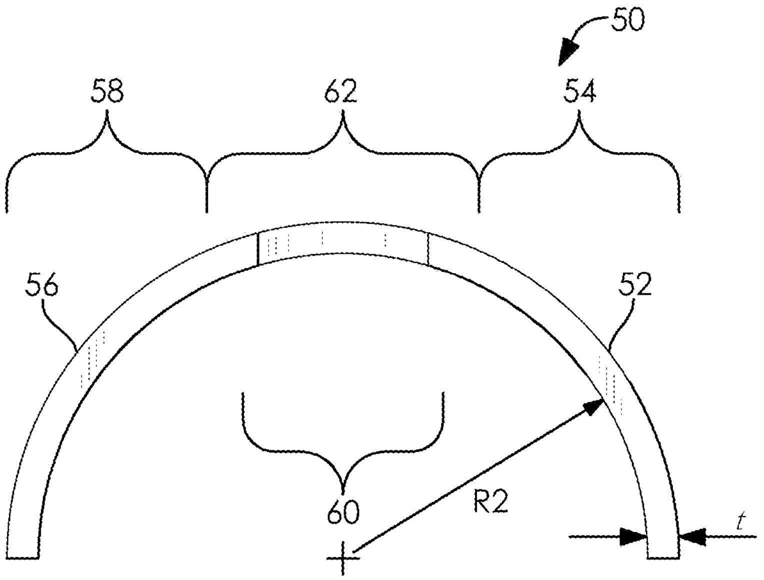
FIG. 5 is an end view of the novel door latch clasp assembly of FIG. 3.

Referring now to FIG. 5, each of the first and second aperture sections 54, 58 and the intermediate section 60 of the clasp assembly 50 can have an arcuate cross-sectional shape formed with a radius R2. The radius R2 can be about an inch in certain non-limiting examples. The arcuate shape of the first and second aperture sections 54, 58 and the intermediate section 60 can approximate the circular cross-sectional shape of the face bore 50 in a manner such that in an installed orientation, the first and second aperture sections 54, 58 and the intermediate section 60 of the clasp assembly 50 seats against the interior perimeter wall 40 of the face bore 18.

While the embodiment of the clasp assembly 50 shown in FIG. 5, illustrates each of the first and second aperture sections 54, 58 and the intermediate section 60 as having an arcuate shape with the radius R2, it should be appreciated that in other embodiments, each of the first and second aperture sections 54, 58 and the intermediate section 60 can have other shapes sufficient to seats against the interior perimeter wall 40 of the face bore 18.

Referring again to FIGS. 3 and 4, the latch assembly aperture 62 can have a generally keyhole cross-sectional shape, with a width w and a height h. The width w and the height h of the latch assembly aperture 62 can be sufficiently sized such as to be larger than a width and height of a corresponding portion of the latch assembly that is encircled by the clasp assembly 50. In certain embodiments, the height h can be in a range from about 0.5 inches to about 1 inch, and most particularly, about 0.88 inches.

Referring again to FIGS. 3-5 and 7, 8, the clasp assembly 50 has a thickness t. The thickness t can be configured for several functions. First, the thickness t can be configured to provide structural rigidity to the clasp assembly 50. Second, the thickness t can be configured to be sufficiently thin so as to facilitate positioning within the space formed by the face bore 18 and alongside the latch assembly 24. Finally, the thickness t is configured to provide sufficient material surrounding the first and second apertures 52, 56 as to allow the apertures to be threaded and receive a correspondingly threaded fastener. In the illustrated embodiment, the thickness t can be in a range of from about 0.01 inches to about 0.25 inches. In a most particular embodiment, the thickness t can be about 0.06 inches. However, in other embodiments, the thickness t can be less than about 0.01 inches or more than about 0.25 inches, sufficient for the functions described herein.

Referring again to FIGS. 3-5 and 7, 8, the clasp assembly 50 is shown as a unitary member formed from a metallic material, such as for example, aluminum, brass or steel. In certain embodiments, the unitary member can be formed from a piece of metallic material having a length of about 3 inches and a width of about 1 inch. In other embodiments, the clasp assembly 50 can be formed from discrete elements that are connected together and can be formed other suitable materials, including the non-limiting example of reinforced polymetric materials.

Figure 6:
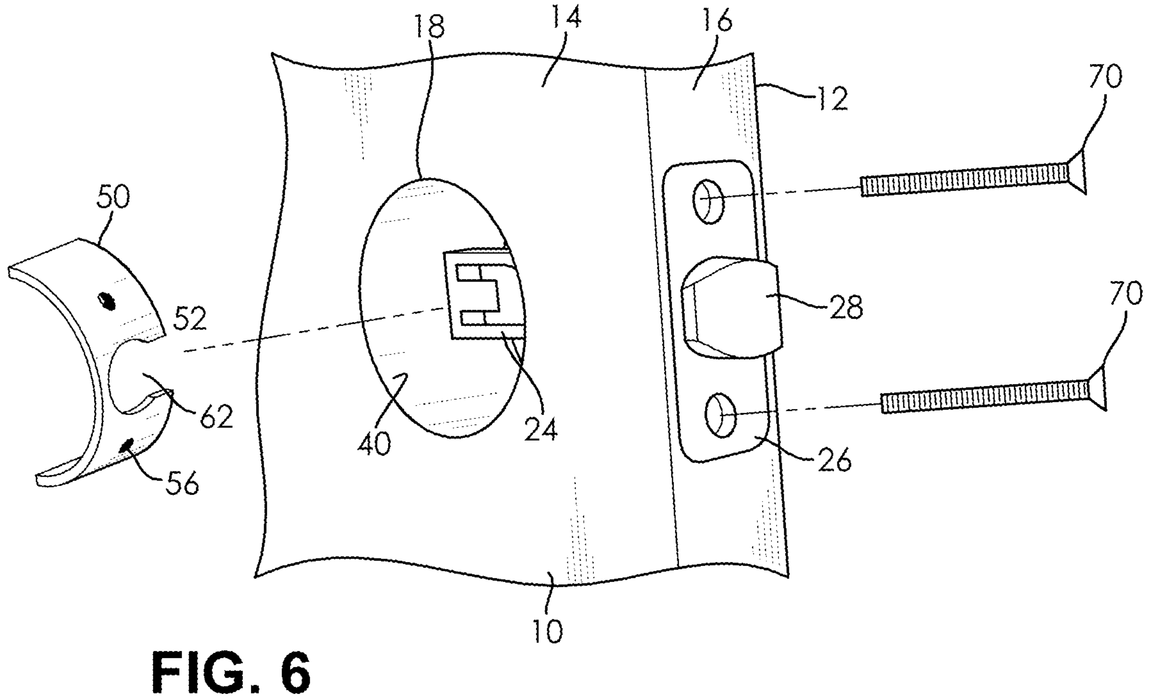
FIG. 6 is a perspective view of the conventional door of FIG. 1 illustrating installation of the novel door latch clasp assembly of FIG. 3.
Figure 7:
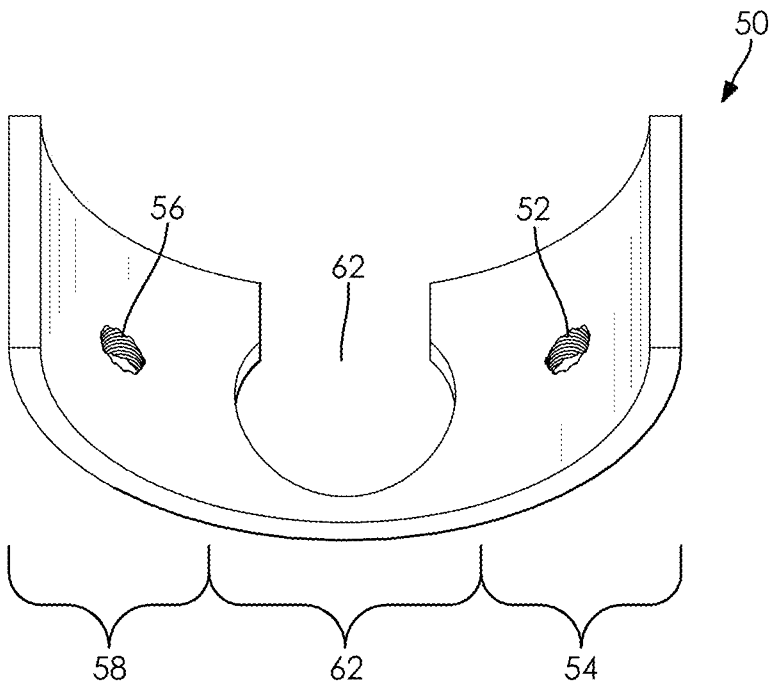
FIG. 7 is a perspective view of the novel door latch clasp assembly of FIG. 3.
Figure 8:
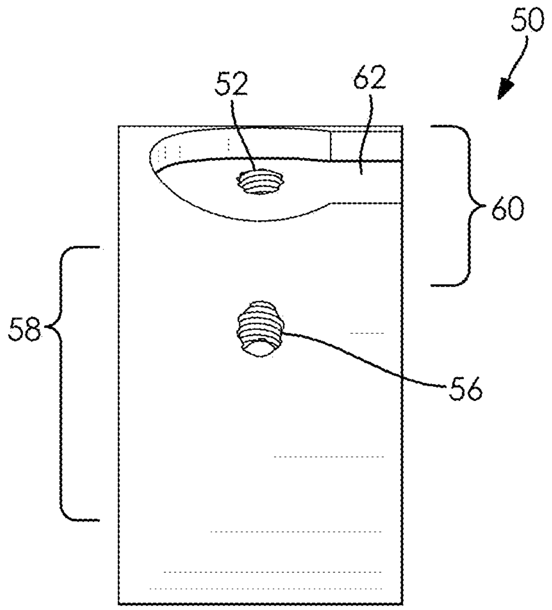
FIG. 8 is a side view of the novel door latch clasp assembly of FIG. 3.
Figure 12:
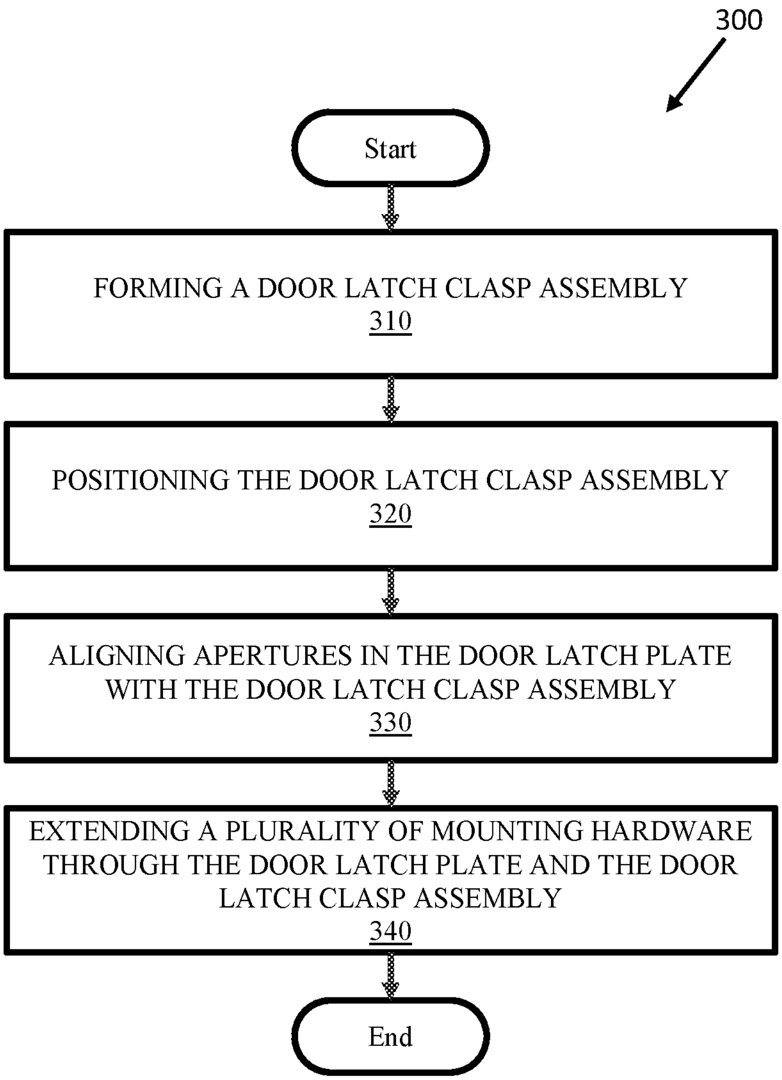
FIG. 12 is a flow chart illustrating a method of installation of the door latch clasp assembly, according to another embodiment of the present disclosure.

Referring now to FIGS. 6 and 12, a method 300 of installation of the clasp assembly 50 is shown. The door 10 includes the face bore 18 and the interior perimeter wall 40. Portions of the latch assembly 24 extend into the face bore 18. In a first installation step 310, the arcuate shapes of the first and second aperture sections 54, 58 and the intermediate section 60 can be aligned with the interior perimeter wall 40 of the face bore 18. In a next step 320, the latch assembly aperture 62 of the clasp assembly 50 can be aligned with the latch assembly 24. In a next step 330, the clasp assembly 50 can be inserted into the face bore 18 in a manner such that the arcuate shapes of the first and second aperture sections 54, 58 and the intermediate section 60 seat against the interior perimeter wall 40 of the face bore 18 and portions of the latch assembly 24 are encircled within the latch assembly aperture 62. In a next installation step 340, a plurality of latch plate hardware 70 can be inserted through apertures in the latch plate 26. Each of the latch plate hardware 70 extends until the hardware engages the first and second apertures 52, 56 of the clasp assembly 50. In a final installation step 210, the hardware 70 can be tightened until the latch assembly 24 is secured to the door 10. In the illustrated embodiment, the latch plate hardware 70 has the form of machine screws configured to engage the correspondingly threaded first and second apertures 52, 56 of the clasp assembly 50. However, in other embodiments, it is contemplated that the latch plate hardware 70 can have other forms, such as the non-limiting examples of clips, clamps, pins and springs, sufficient to secure the latch assembly to the door 10.

Figure 9:
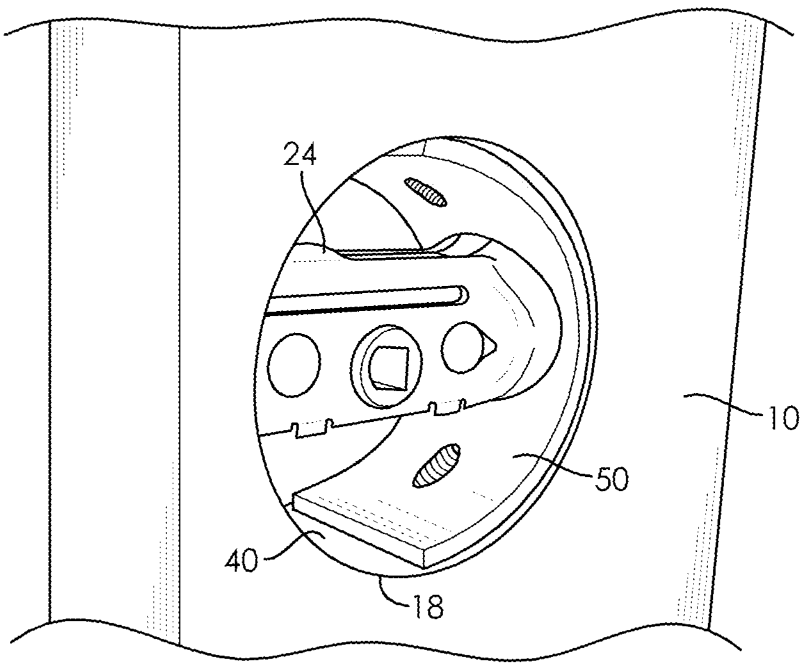
FIG. 9 is a right-side perspective view of the conventional door of FIG. 1 illustrating installation of the novel door latch clasp assembly of FIG. 3.
Figure 10:
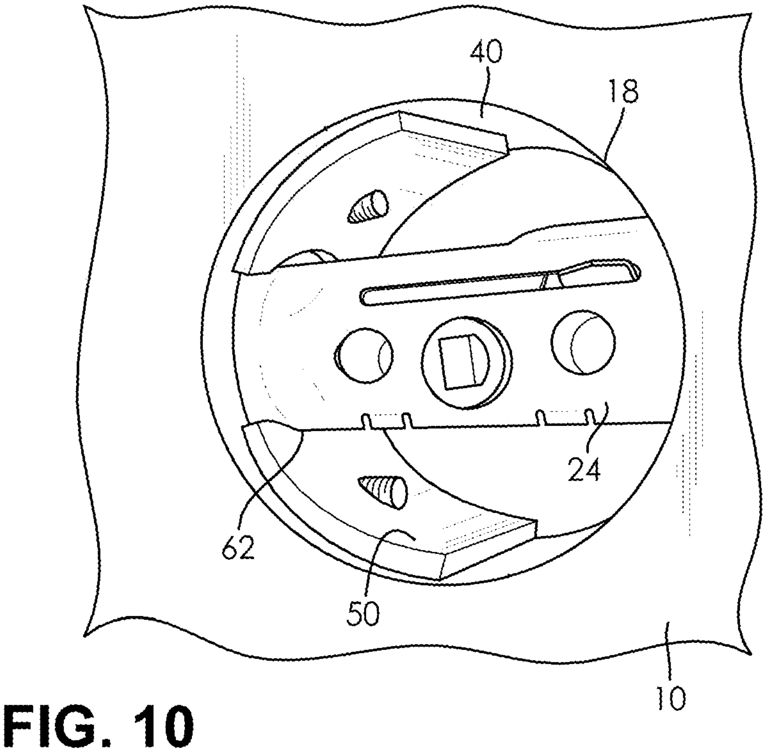
FIG. 10 is left-side perspective view of the conventional door of FIG. 1 illustrating installation of the novel door latch clasp assembly of FIG. 3.

Referring now to FIGS. 9 and 10, the clasp assembly 50 is shown in an installed orientation within the face bore 18 of the door 10. In the installed orientation, the arcuate shapes forming the clasp assembly 50 seat against the interior perimeter wall 40 of the face bore 18 and portions of the latch assembly 24 are encircled within the latch assembly aperture 62.

It should be appreciated that the embodiment of the clasp assembly 50 shown in FIG. 10 is configured such that the keyhole shape of the latch assembly aperture 62 facilitates insertion of the clasp assembly 50 into the face bore 18 without removal of the latch assembly. However, it is contemplated that in other embodiments, the latch assembly aperture 62 can be defined by other shapes, including continuous shapes, which may require removal of the latch assembly 24 prior to insertion of the clasp assembly 50 into the face bore 18.

Figure 11:
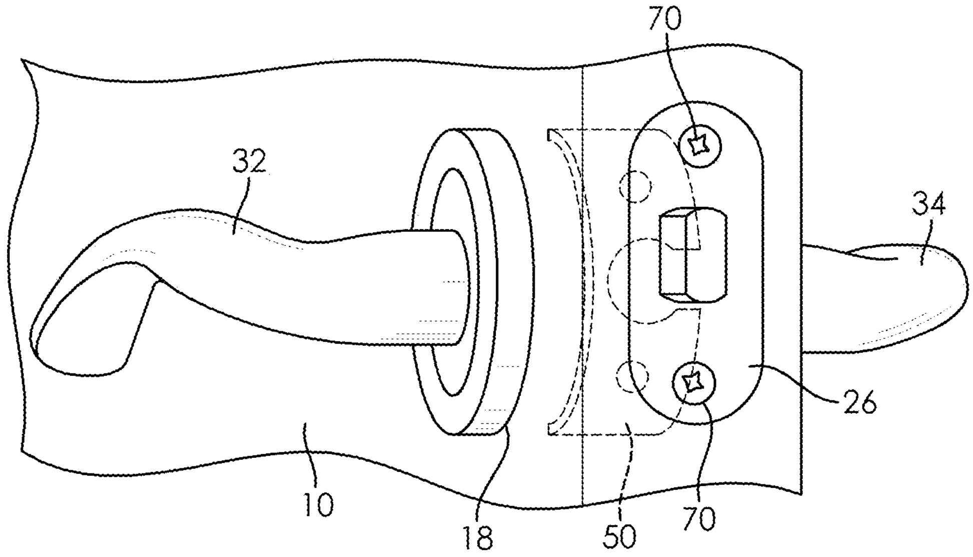
FIG. 11 is a perspective view, partially in phantom, of the conventional door of FIG. 1 illustrating the novel door latch clasp assembly of FIG. 3 in an installed orientation.

Referring now to FIG. 11, the clasp assembly 50 is shown in an installed orientation within the face bore 18 of the door 10. The first and second knob assemblies 32, 34 are also shown in an installed orientation.

The clasp assembly provides certain benefits and advantages in securing door latches, door handles, and associated hardware. First, it is believed the clasp assembly is new to the market and there is nothing like it available on the market today. Second, the clasp assembly is configured for use within an existing face bore of a door. Third, the clasp assembly creates a new medium or backing for the new fasteners, such as machine screws, for use securing the existing latch assembly to the door. Fourth, the clasp assembly can be used in the event existing material within the door has been worn out or damaged, and conventional screws can no longer catch/screw into the inside material of the door. Fifth, the clasp assembly 50 can be seated within the face bore of the door, over the latch assembly, on the same side of the door where the latch assembly is inserted. Sixth, the clasp assembly can be configured to allow a dead latch cylinder housing that requires room to sit inside the face bore for installation. Finally, the clasp assembly has a thin footprint and is not visible, except for the new fasteners (e.g., machine screws) used to tighten down the latch assembly, once the door hardware is reinstalled.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of using a door latch clasp assembly configured for use with a door having a front surface, a rear surface, a side surface extending from the front surface to the rear surface, a door latch assembly, a door latch plate disposed on the side surface of the door, and a face bore extending from the front surface to the rear surface and having an interior perimeter wall with an arcuate cross-sectional shape, the method comprising the steps of:

providing an arcuate member of the door latch clasp assembly, the arcuate member having an arcuate face, a first threaded aperture positioned proximate a first end, a second threaded aperture positioned proximate an opposing second end, and a latch assembly aperture positioned between the first threaded aperture and the second threaded aperture, wherein the arcuate member is configured to seat against the interior perimeter wall of the face bore of the door, wherein the first threaded aperture aligns with a first aperture of the door latch plate of the door latch assembly, the door latch plate is positioned in a latch plate recess disposed in the side surface of the door, and the second threaded aperture aligns with a second aperture of the door latch plate of the door latch assembly, and wherein the arcuate member has an outer major surface and an opposing inner major surface, each of the first threaded aperture and the second threaded aperture is disposed on the arcuate face and extends from the outer major surface to the opposing inner major surface, and a portion of the door latch assembly extends through both the outer major surface and the opposing inner major surface, and wherein the arcuate member has a maximum thickness in a range of from about 0.1 inches to about 0.25 inches;

providing a first latch plate screw;

providing a second latch plate screw;

positioning the arcuate member of the door latch clasp assembly against the arcuate cross-sectional shape of the interior perimeter wall of the face bore of the door;

extending the first latch plate screw through the first aperture of the door latch plate and threading the first latch plate screw into the first threaded aperture of the arcuate member; and extending the second latch plate screw extending through the second aperture of the door latch plate and threading the second latch plate screw into the second threaded aperture of the arcuate member.

2. The method of claim 1, including the step of encircling the door latch assembly with the latch assembly aperture.

3. The method of claim 1, including the step of forming the latch assembly aperture with width and height dimensions that are larger than width and height dimensions of the door latch assembly.

4. The method of claim 1, including the step of reusing the door latch assembly and the door latch plate.

5. A door hardware installation, comprising a door having a front surface, a rear surface, a side surface extending from the front surface to the rear surface, a door latch assembly, a door latch plate disposed on the side surface of the door, and a face bore extending from the front surface to the rear surface and having an interior perimeter wall with an arcuate cross-sectional shape; and a door latch clasp assembly including an arcuate member having an arcuate face, a first threaded aperture positioned proximate a first end, a second threaded aperture positioned proximate an opposing second end, and a latch assembly aperture positioned between the first threaded aperture and the second threaded aperture, wherein the arcuate member is seated against the interior perimeter wall of the face bore of the door, wherein the first threaded aperture aligns with a first aperture of the door latch plate of the door latch assembly, the door latch plate is positioned in a latch plate recess disposed in the side surface of the door, and the second threaded aperture aligns with a second aperture of the door latch plate of the door latch assembly, and wherein the arcuate member has an outer major surface and an opposing inner major surface, each of the first threaded aperture and the second threaded aperture is disposed on the arcuate face and extends from the outer major surface to the opposing inner major surface, and a portion of the door latch assembly extends through both the outer major surface and the opposing inner major surface, and wherein the arcuate member has a maximum thickness in a range of from about 0.1 inches to about 0.25 inches, a first latch plate screw, and a second latch plate screw;

wherein the door latch clasp assembly is positioned against the arcuate cross-sectional shape of the interior perimeter wall of the face bore of the door, wherein the first latch plate screw extends through the first aperture of the door latch plate and the first latch plate screw is threaded into the first threaded aperture of the arcuate member; and wherein the second latch plate screw extends through the second aperture of the door latch plate and the second latch plate screw is threaded into the second threaded aperture of the arcuate member.

* * * * *